United States Patent
Pryor, Jr.

(10) Patent No.: US 8,157,435 B2
(45) Date of Patent: Apr. 17, 2012

(54) LID FOR A MIXING DEVICE

(75) Inventor: Ernest B. Pryor, Jr., Maidens, VA (US)

(73) Assignee: Hamilton Beach Brands, Inc, Glen Allen, PA (US)

( * ) Notice: Subject to any disclaimer, the term of this patent is extended or adjusted under 35 U.S.C. 154(b) by 543 days.

(21) Appl. No.: 12/401,686

(22) Filed: Mar. 11, 2009

(65) Prior Publication Data
US 2010/0232256 A1    Sep. 16, 2010

(51) Int. Cl.
*A47J 43/046* (2006.01)
(52) U.S. Cl. ............. 366/205; 366/314; 241/282.1
(58) Field of Classification Search ............. 366/205, 366/314; 241/282.1, 282.2
See application file for complete search history.

(56) References Cited

U.S. PATENT DOCUMENTS

| | | | |
|---|---|---|---|
| 2,221,749 A * | 11/1940 | Allen | 222/110 |
| 3,606,178 A | 9/1971 | Klopp | |
| D228,698 S | 10/1973 | Barnard, Jr. et al. | |
| D241,125 S | 8/1976 | Knapp | |
| D242,208 S | 11/1976 | Madl et al. | |
| D255,759 S | 7/1980 | Ernest | |
| 4,463,869 A | 8/1984 | Lewis | |
| 4,473,167 A | 9/1984 | Bailey | |
| 4,739,900 A | 4/1988 | Borst | |
| 4,881,668 A | 11/1989 | Kitterman et al. | |
| 4,949,884 A * | 8/1990 | Dahl | 222/570 |
| 5,048,730 A | 9/1991 | Forsyth et al. | |
| D336,590 S | 6/1993 | Barnard | |
| 5,244,113 A | 9/1993 | Stymiest | |
| 5,415,312 A | 5/1995 | Mueller | |
| 5,526,949 A * | 6/1996 | Carey et al. | 215/386 |
| 5,873,493 A | 2/1999 | Robinson | |
| 5,927,535 A | 7/1999 | Goth | |
| 5,957,577 A | 9/1999 | Dickson et al. | |
| D417,581 S | 12/1999 | Barthelemy et al. | |
| D417,815 S | 12/1999 | Endres | |
| D419,369 S | 1/2000 | Naft et al. | |
| D424,865 S | 5/2000 | Crescenzi et al. | |
| D433,595 S | 11/2000 | Naft et al. | |
| D439,106 S | 3/2001 | Naft et al. | |
| D440,813 S | 4/2001 | Gort-Barten | |
| D443,468 S | 6/2001 | Blaise | |
| D444,344 S | 7/2001 | Barthelemy et al. | |
| D444,995 S | 7/2001 | Thackray | |
| 6,467,948 B1 | 10/2002 | Lawson | |
| D466,362 S | 12/2002 | Moore | |
| D466,760 S | 12/2002 | Baerenrodt et al. | |
| D466,761 S | 12/2002 | Baerenrodt et al. | |
| 6,488,187 B2 | 12/2002 | Sheffler et al. | |
| 6,523,994 B2 | 2/2003 | Lawson | |
| 6,575,323 B1 | 6/2003 | Martin et al. | |
| D478,468 S | 8/2003 | Holderfield et al. | |
| D484,357 S | 12/2003 | Seum et al. | |
| 6,783,019 B2 | 8/2004 | Zettle et al. | |

(Continued)

*Primary Examiner* — David Sorkin
(74) *Attorney, Agent, or Firm* — Alexander D. Raring

(57) ABSTRACT

A lid that is removably mountable to an upper open end of a jar of a mixing device includes a generally circular base having a top surface and a opposing bottom surface. A pour spout extends generally vertically upwardly from the base when the lid is mounted to the upper end of the jar. The pour spout has a crisp edge for pouring foodstuff when the lid is mounted to the jar. Further, the lid includes a channel that generally surrounds the pour spout to collect errant drips of foodstuff when the lid is mounted to the jar and when foodstuff is poured through the pour spout.

11 Claims, 7 Drawing Sheets

U.S. PATENT DOCUMENTS

| | | |
|---|---|---|
| 7,021,481 B2 | 4/2006 | St. Germain et al. |
| D525,481 S | 7/2006 | Kassenaar |
| D525,482 S | 7/2006 | Kassenaar |
| D533,020 S | 12/2006 | Kassenaar et al. |
| D542,085 S | 5/2007 | Reyes et al. |
| D550,507 S | 9/2007 | Picozza et al. |
| D552,419 S | 10/2007 | Picozza et al. |
| 7,275,666 B2 | 10/2007 | Rukavina et al. |
| D556,506 S | 12/2007 | Spagnolo et al. |
| D563,164 S | 3/2008 | Sands |
| D584,106 S | 1/2009 | Wong |
| 7,530,478 B2 | 5/2009 | Blomdahl et al. |
| 7,537,137 B2 | 5/2009 | Giraud |
| 7,568,590 B1 | 8/2009 | Gross et al. |
| 2001/0002891 A1* | 6/2001 | Frankel et al. ............... 366/146 |
| 2002/0044496 A1 | 4/2002 | Lawson |
| 2005/0152215 A1 | 7/2005 | Stuart et al. |
| 2007/0147171 A1 | 6/2007 | Reyes et al. |
| 2007/0297281 A1 | 12/2007 | Saunders et al. |
| 2008/0277020 A1 | 11/2008 | Windmiller |
| 2009/0101645 A1 | 4/2009 | Wilson et al. |
| 2009/0129200 A1 | 5/2009 | Breviere et al. |
| 2009/0134188 A1 | 5/2009 | Wilson et al. |
| 2009/0140006 A1 | 6/2009 | Vitantonio et al. |
| 2009/0173737 A1 | 7/2009 | Ramsey et al. |
| 2009/0194535 A1 | 8/2009 | Reed et al. |
| 2009/0200296 A1 | 8/2009 | Iwasaki |

* cited by examiner

LID FOR A MIXING DEVICE

BACKGROUND OF THE INVENTION

This invention generally relates to an enclosure for a container of a mixing device or other such appliance and, more particularly, to a lid that is removably mounted to an upper open end of a jar of a blender that allows for quick, convenient and clean pouring of blended foodstuff from the jar when the lid is mounted to the jar.

Mixing devices, kitchen blenders or other such appliances have become popular and are commonly used in residential and/or commercial kitchens or other locations where foodstuff is prepared. However, despite their popularity, mixing devices can often create quite a mess during operation and often require extensive cleaning or clean-up once blending is complete. For example, operation of a mixing device or blender often creates errant splashes of blended foodstuff that unintentionally reach outside of the jar or container of the mixing device. Additionally, in recent years, manufacturers of mixing devices or blenders have devised alternative ways to dispense blended foodstuff from within the container of the mixing device once the mixing has ceased. One such method is to use a dispensing spout operatively connected to the container to dispense blended foodstuff directly into a cup or mug without removing the container from a base of the mixing device. However, a dispensing spout often includes intricate parts, can be costly to manufacture, and is often difficult to clean after use of the blender.

Therefore, it would be desirable to create an enclosure for a container of a mixing device that prevents errant splashes of blended foodstuff from reaching outside of the container. Specifically, it would desirable to create a lid that is removably mountable to an upper open end of a jar of a blender to help reduce the mess associated with operating a blender. Further, it would be desirable to create a device that assists a user or consumer of the mixing device in dispensing the foodstuff from the container of the mixing device without the use of a dispensing spout. Specifically, it would be desirable to create a lid of a jar of a blender that allows for pouring of blended foodstuff from within the jar without removing the lid from the jar.

BRIEF SUMMARY OF THE INVENTION

Briefly stated, the present invention is directed to a lid that is removably mountable to an upper open end of a jar of a mixing device or blender. The lid includes a base having a top surface and an opposing bottom surface and a pour spout extending generally vertically upwardly from the base when the lid is mounted to the upper end of the jar. The pour spout has a crisp edge for pouring foodstuff when the lid is mounted to the jar. The lid further includes a channel that generally surrounds the pour spout to collect errant drips of foodstuff when the lid is mounted to the jar and when foodstuff is poured through the pour spout.

In another aspect, the present invention is directed to a mixing device configured to blend foodstuff. The device includes a housing that encloses at least one motor and a jar that is removably mountable to the housing in an operating configuration for containing foodstuff. The jar has an upper open end and a lower closed end. The mixing device includes a lid that is removably mountable to the upper open end of the jar to enclose foodstuff therein. The lid includes a pour spout that extends generally vertically upwardly from the lid and a channel generally surrounds the pour spout. The pour spout has a crisp edge for pouring foodstuff out of the jar when the lid is mounted to the jar. The channel collects errant drips of the foodstuff when the lid is mounted to the jar and the foodstuff is poured out of the jar through the pour spout.

BRIEF DESCRIPTION OF THE SEVERAL VIEWS OF THE DRAWINGS

The following detailed description of two preferred embodiments of the invention will be better understood when read in conjunction with the appended drawings. For the purpose of illustrating the invention, there is shown in the drawings two embodiments which are presently preferred. It should be understood, however, that the invention is not limited to the precise arrangements and instrumentalities shown.

In the drawings.

DETAILED DESCRIPTION OF THE INVENTION

Figure 1:
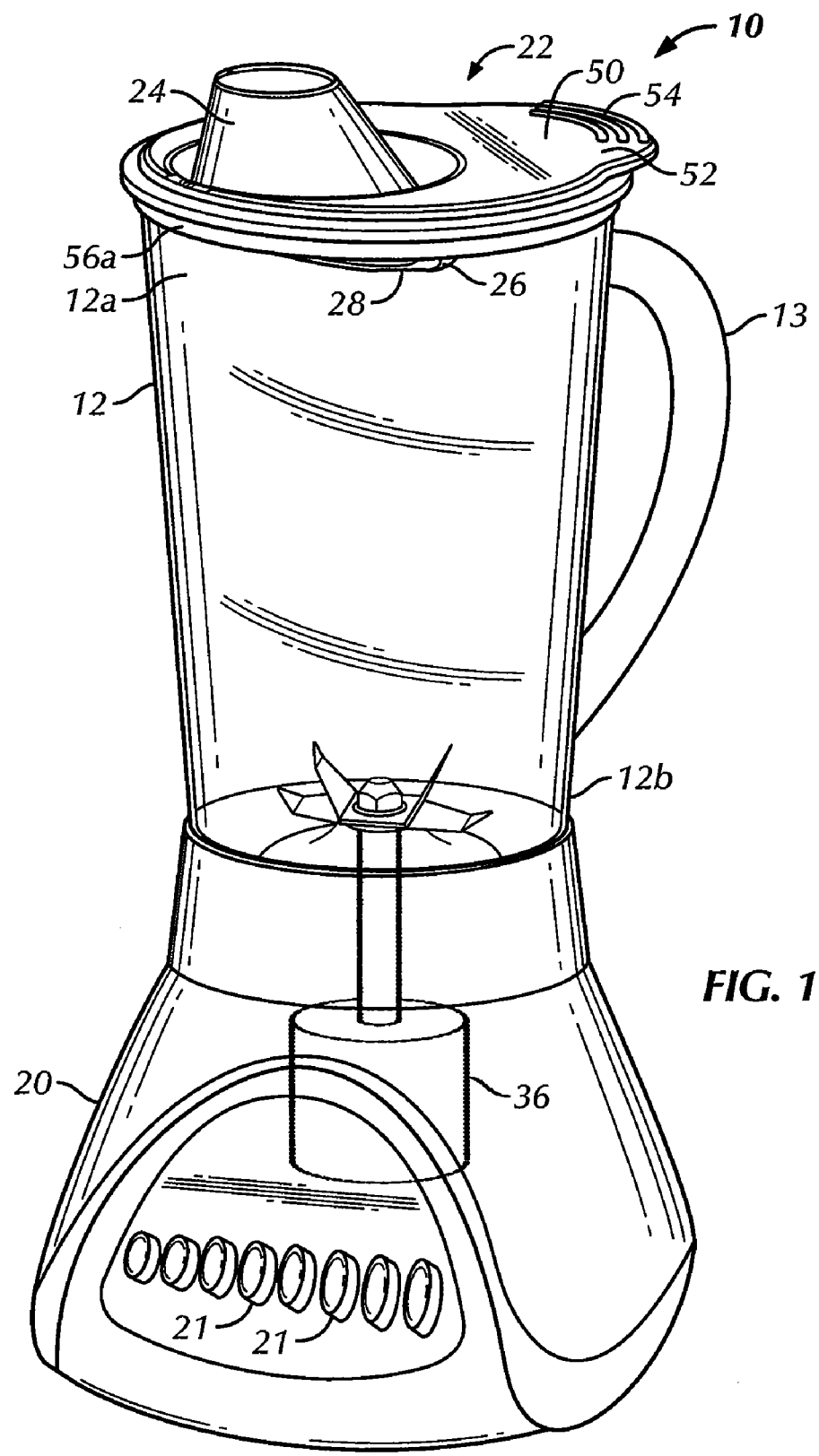
FIG. 1 is a perspective view of a mixing device configured to blend foodstuff used in conjunction with a lid in accordance with a first preferred embodiment of the present invention.
Figure 2:
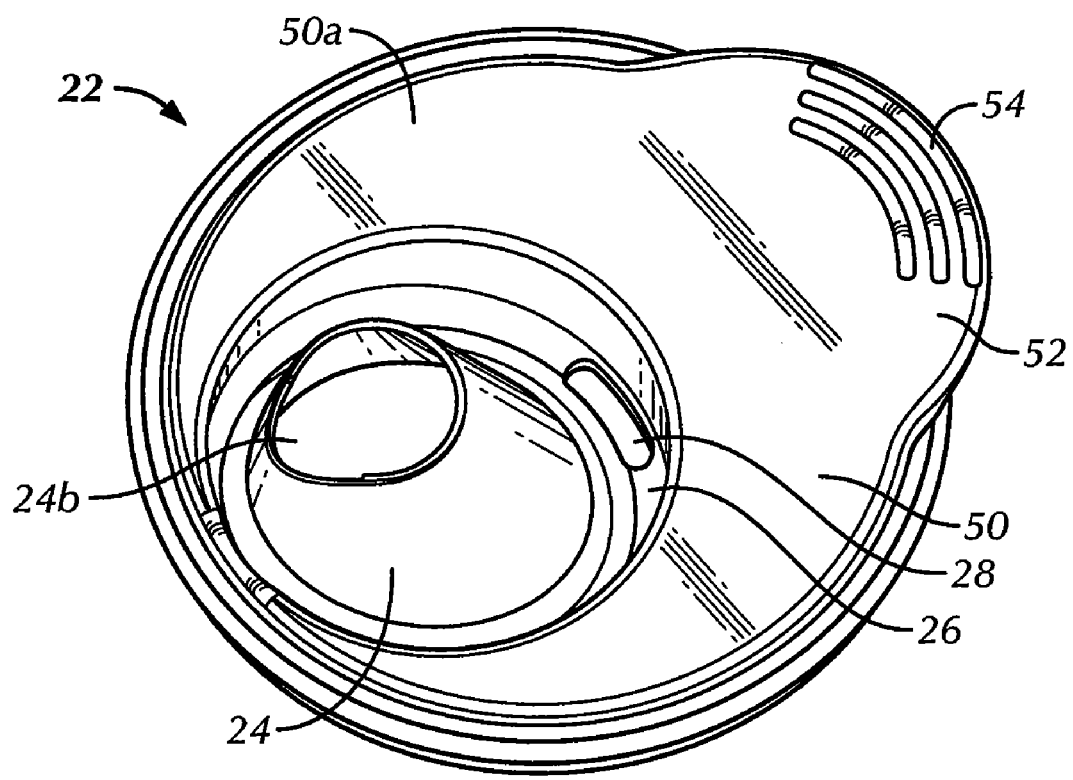
FIG. 2 is a top left perspective view of the lid shown in FIG. 1.

Certain terminology is used in the following description for convenience only, and is not limiting. The words "right," "left," "upper," and "lower" designate directions in the drawings to which reference is made. The words "inwardly" and "outwardly" refer to directions toward and away from, respectively, the geometric center of the mixing device or lid and designated parts thereof. Additionally, the word "a" as used in the specification means "at least one." The terminology includes the words specifically mentioned, derivatives thereof and words of similar import.

Referring to the drawings in detail, wherein like numerals indicate like elements throughout, there is shown in FIGS. 1-6 a first preferred embodiment of an enclosure or lid, generally indicated 22, in accordance with the present invention. The lid 22 is preferably removably mountable to an upper open end 12a or rim of a container or jar 12 of a mixing device or blender 10 configured to blend foodstuff. It is understood by those skilled in the art that the lid 22 is preferably used in conjunction with the mixing device 10 shown in FIG. 1. However, the lid 22 is not limited to being used in conjunction with the mixing device 10 as shown in the FIG. 1, but may be used with virtually any other food processor or blending apparatus.

Referring to FIG. 1, the mixing device or blender 10 used in conjunction with the lid 22 of the present invention preferably includes a housing 20 that encloses at least one motor 36. The jar or container 12 is removably mountable to the housing 20 in an operating configuration (FIG. 1) for containing foodstuff therein. The jar 12 may be formed of virtually any material, but the jar 12 is preferably made of glass or a polymeric material. As one of ordinary skill would understand, the benefits of using the lid 22 are especially identifiable when used with a jar 12 made of glass. Specifically, as one of ordinary skill in the art understands, the manufacturing process for glass makes it difficult to create sharp edges. Therefore, it can be especially difficult for a user to pour blended foodstuff from a glass jar. Attaching the lid 22 of the present embodiment to a glass jar provides an appealing solution to this problem. In contrast, one of ordinary skill understands that that it is generally easier to manufacture sharp edges in a jar 12 made of plastic. However, the lid 22 of the present embodiment can also improve the pouring performance from a jar 12 made of plastic.

The housing 20 may include a plurality of control buttons 21 and/or a control dial (not shown) to allow a user or consumer to selectively operate the at least one motor 36 within the housing 20. The jar 12 includes the upper open end 12a or rim and a lower closed end 12b. In the present embodiment, the upper open end 12a of the jar 12 is generally a circular rim without a pour spout. However, the upper open end 12a of the jar 12 is not limited to being circular in shape, as the upper open end 12a may be generally square, ovular or triangular, for example, when viewed from above. Furthermore, in an alternative embodiment, the upper open end 12a of the jar 12 may include a pour spout (not shown). The lower closed end 12b of the jar 12 may come into direct contact with a top surface of the housing 20 when the jar 12 is mounted to the housing 20. Alternatively, the mixing device 10 may include a collar (not shown) integrally formed with the lower closed end 12b of the jar 12 or removably mountable between the jar 12 and the housing 20. The jar 12 may also include a handle 13 and a dispensing spout (not shown) or dispensing assembly (not shown).

Referring to FIGS. 1-6, the lid 22 generally includes a base portion or base 50, a pour spout 24 and a drip-catching channel 26. The base 50 has a top surface 50a and an opposing bottom surface 50b. Although the base 50 is generally circular in shape when viewed from above or below, it is understood that the shape of the base 50 may be modified to conform to the size and shape of the upper open end 12a of the jar 12. When viewed from above or below, the base 50 generally surrounds the pour spout 24 and the channel 26. When the lid 22 is mounted to the jar 12, the top surface 50a of the base 50 is exposed to the external environment and the bottom surface 50b of the base 50 encloses the foodstuff within the jar 12. The lid 22 is preferably formed of a high-strength, lightweight material, such as a polymeric material. However, the lid 22 may be formed of virtually any material, such as a metallic material or a fiber glass or composite material, for example.

A grasping mechanism or handle 52 extends outwardly from the top surface 50a of the base 50. The handle 52 is generally arcuate in shape when viewed from above or below, but may be in virtually any size or shape to assist a user in removing the lid 22 from the jar 12 or placing the lid 22 onto the jar 12. At least one rib or raised protuberance 54 is integrally formed on at least one of an upper and lower surface of the handle 52 to assist in grasping the lid 22. Preferably, the handle 52 includes a plurality of spaced-apart arcuate ribs 54 located on at least one of the upper and lower surfaces of the handle 52. It is understood by those skilled in the art that the handle 52 is not limited to the inclusion of one or more ribs or raised protuberances 54, but may have generally smooth exterior surfaces on at least a portion of the handle 52. Furthermore, the lid 22 is not limited to the inclusion of the handle 52, as the lid 22 may be void of any handle.

Figure 3:
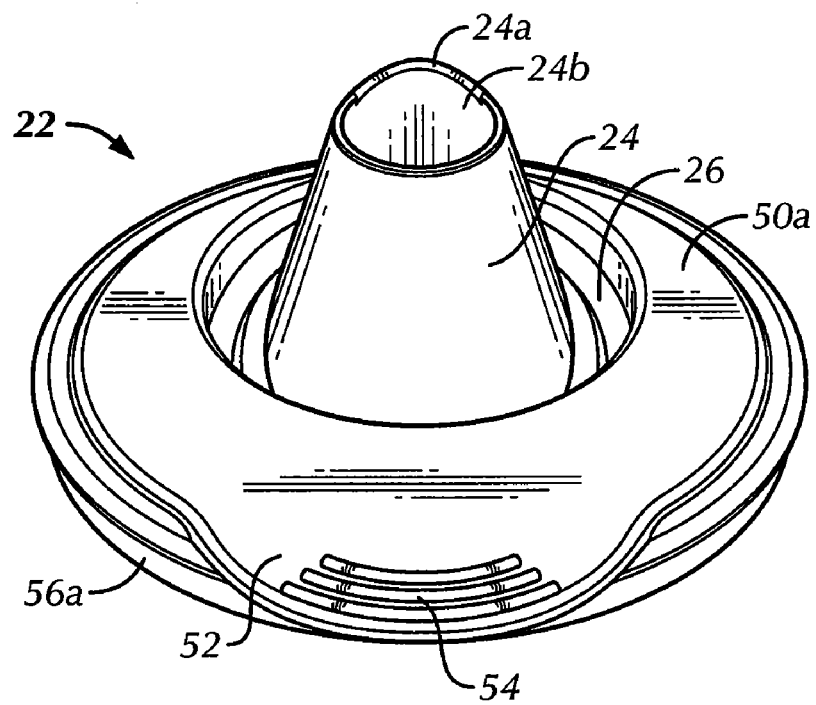
FIG. 3 is a top rear perspective view of the lid shown in FIG. 2.
Figure 4:
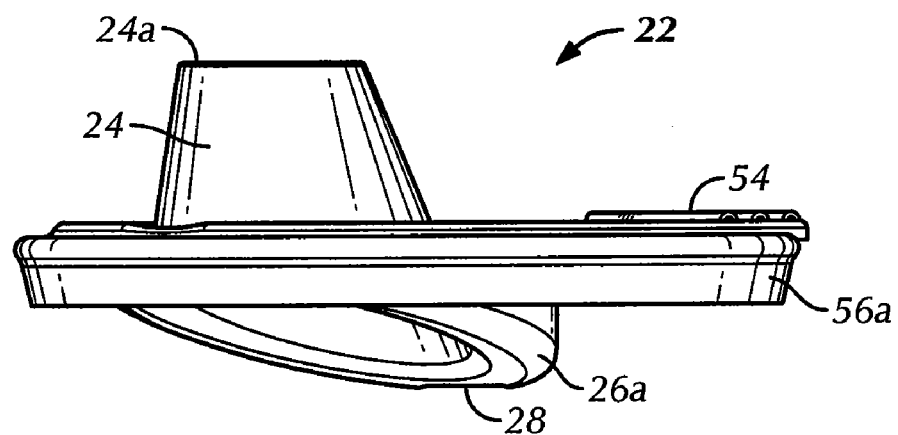
FIG. 4 is a left side elevation view of the lid shown in FIG. 2.
Figure 5:
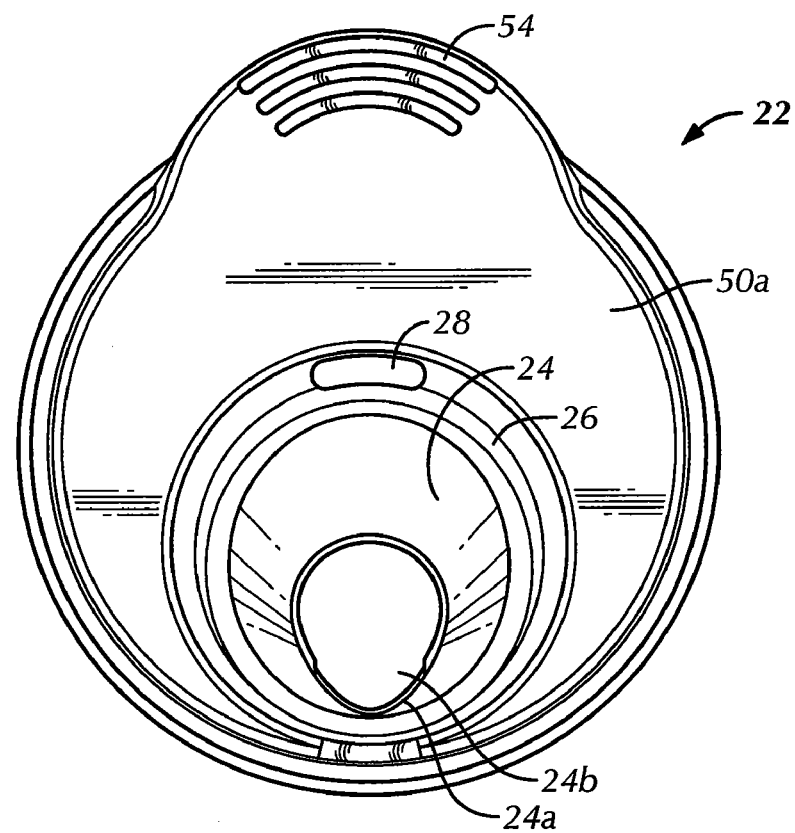
FIG. 5 is a top plan view of the lid shown in FIG. 2.
Figure 6:
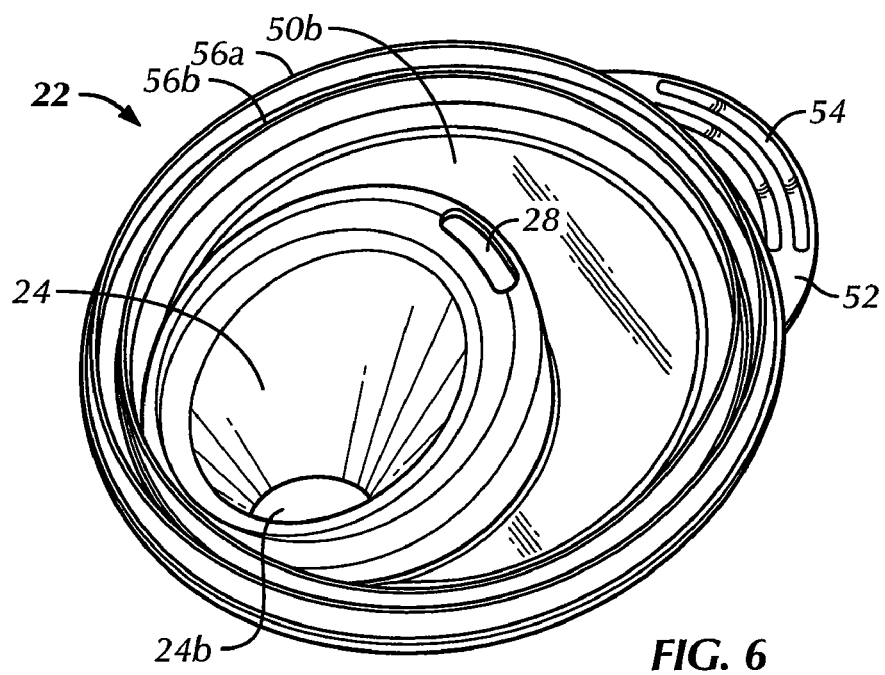
FIG. 6 is a bottom right perspective view of the lid shown in FIG. 2.

Referring to FIGS. 3, 4 and 6, a pair of spaced-apart walls 56 extend generally vertically downwardly from the bottom surface 50b of the base 50. Preferably, the walls 56 are concentric, but the present embodiment is not limited to such a configuration. Specifically, the base 50 preferably includes a generally flexible outer circular wall 56a and a generally flexible inner circular wall 56b. The walls 56 are spaced-apart a predetermined distance to allow the lid 22 to removably engage both the inside and outside surfaces of the rim of the upper open end 12a of the jar 12. Preferably, the walls 56 create a "snap-fit" with the upper open end 12a when the lid 22 is mounted to the jar 12. However, it is understood that one or both of the walls 56 may alternatively or additionally include threads (not shown) on an inner and/or outer surface thereof to mate with complimentary threads (not shown) on a portion of the upper open end 12a to create a "thread fit" between the lid 22 and jar 12.

When the lid 22 is mounted to the jar 12, at least one of the concentric walls 56 grasps or engages an interior surface of the upper open end 12a of the jar 12 or the two concentric walls 56 sandwich or engage the rim of the upper open end 12a of the jar 12 therebetween such that the lid 22 is securely attached to the jar 12 and cannot be inadvertently removed from the jar 12. Preferably, outer wall 56a secures the lid 22 to the jar 12 and inner wall 56b seals the lid 22 to the jar 12 such that blended foodstuff cannot pass between the two. However, the walls 56 are not limited to this configuration or functionality.

As seen in FIG. 6, the concentric walls 56 extend generally perpendicularly from an outer circumference of the bottom surface 50b of the base 50. However, the location of the concentric walls 56 my be modified to conform to the size and shape of various jars 12. Alternatively, the base 50 may include only one downwardly extending wall to engage either the interior or exterior surface of the upper open end 12a of the jar 12. As one of ordinary skill would understand, the combination of spaced-apart and flexible walls 56 requires relatively low installation and removal forces, while providing reliable resistance to inadvertent removal of the lid 22 from the jar 12 during pouring or blending.

Referring to FIGS. 2-6, an upper portion of the pour spout 24 extends generally perpendicularly or vertically upwardly from the lid 22 when the lid 22 is mounted to the upper open end 12a of the jar 12. The pour spout 24 is generally in the shape of an inverted funnel when the lid 22 is mounted to the jar 12. Further, the pour spout 24 includes a passageway 24b therethrough to allow foodstuff to be inserted or removed from the jar 12. As seen in FIGS. 4 and 6, a lower portion 26a of the drip-catching channel 26 extends generally vertically downwardly from the base 50 when the lid 22 is mounted to the upper open end 12a of the jar 12. The lower portion 26b of the drip-catching channel 26 is generally arcuate in shape or has a smooth curved surface. An upper portion of the pour spout 24 has a crisp edge 24a for pouring foodstuff when the lid 22 is mounted to the jar 12. The crisp edge 24a is located proximate a forward portion of the lid 22 and pour spout 24 to promote clean and efficient pouring of the foodstuff. In operation, it is intended that the crisp edge 24a, the handle 52 of the base 50 and the handle 13 of the jar 12 are positioned in or close to a single plane to help promote efficient and clean pouring of the foodstuff from within the jar 12.

As seen in FIGS. 2, 3, 5 and 6, the drip-catching channel 26 at least generally, if not completely, surrounds the outer circumference of the pour spout 24 when viewing this lid 22 from above or below. Further, the outer circumference of the channel 26 is at least generally, if not completely, surrounded by the base 50. The channel 26 is in the form of a groove or indentation in the top surface 50a of the base 50 and is sized and shaped to collect errant drips of foodstuff when the lid 22 is mounted to the jar 12 and when foodstuff is poured through the passageway 24b of the pour spout 24. As seen in FIGS. 1 and 4, the channel 26 is angled downwardly from a front portion of the lid 22 toward a rear portion of the lid 22 when the lid 22 is generally horizontally oriented or in the operating configuration (FIG. 1). At or near a lowest portion of the channel 26 when the lid 22 is attached to the jar 12, the channel 26 includes a generally elongated, generally oval shaped opening 28 extending completely through the lid 22 from the top surface 50a to the bottom surface 50b. However, it is understood by those skilled in the art that the size, shape and location of the opening 28 may be modified. When the lid 22 is attached to the jar 12, the opening 28 is preferably located proximate a geometric center or central area of the lid 22. Thus, the channel 26 is slightly angled toward the opening 28 to funnel errant drips of blended foodstuff back in the jar 12. The lowest part or portion of the channel 26 extends below the bottom surface 50b of the base 50 and into the jar 12 when the lid 22 is mounted to the jar 12.

In operation, the lid 22 may be secured to the upper open end 12a of the jar 12 either during the blending process or once the blending process has ceased. If the lid 22 is not used during the blending process, it is preferred that another form of enclosure (not shown) is used to completely enclose the jar 12 to prevent errant foodstuff from inadvertently exiting the jar 12 during blending. Once blending has ceased, the user places the lid 22 securely onto the upper open end 12a of the jar 12, as was described in detail above.

When the user or consumer is prepared to drink or consume the blended foodstuff, the jar 12 is removed from the housing 20, preferably by the handle 13, and tilted towards a cup, bowl or other receptacle (not shown). Although it is not necessary, it is helpful if the crisp edge 24a of the pour spout 24 and the handle 13 of the jar 12 are in, or close to, a single plane to quickly, conveniently and cleanly pour the blended foodstuff from the jar 12, through the pour spout 24 of the lid 22, and into the container. Once the user has filled the container to a desired level, the user places the jar 12 back onto the housing 20. At this point, any errant drips of foodstuff located on or near the top surface 50a of the base 50 or on the pour spout 24 are pulled by gravity toward the channel 26 and ultimately through the opening 28. Thus, the errant drips of foodstuff are returned to the interior of the jar 12.

Referring to FIGS. 7-10, a second preferred embodiment of the enclosure or lid 122 is shown, wherein like numerals are used to identify like elements throughout and the reference numerals of the second preferred embodiment are increased by a magnitude of one hundred (100) from the numerals of the first preferred embodiment. The lid 122 of the second preferred embodiment is substantially similar in structure and operation to the lid 22 of the first preferred embodiment described above. For example, the lid 122 includes a base portion or base 150 and a pour spout 124, having a crisp pouring edge 124a, that is generally surrounded by a drip-catching channel 126. As in the first preferred embodiment, the channel 126 preferably collects errant drips or splashes of foodstuff that have accumulated on the lid 22 and directs/funnels the foodstuff back into the interior of the jar 112.

Figure 7:
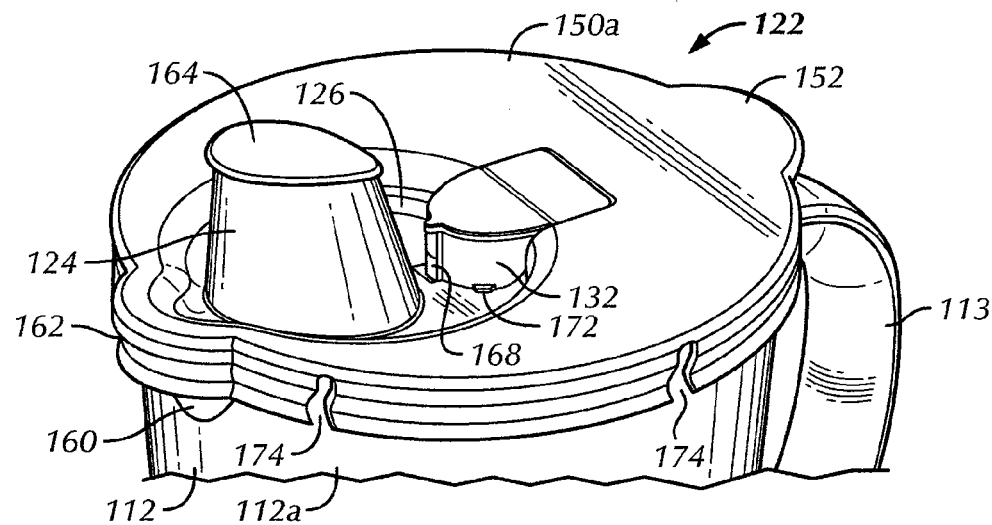
FIG. 7 is a perspective view of a lid in accordance with a second preferred embodiment of the present invention used in conjunction with a jar.

As seen in FIG. 7, the jar 112 used in conjunction with the lid 122 of the second preferred embodiment is slightly different from the jar 12 used in conjunction with the lid 22 of the first preferred embodiment. Specifically, the jar 112 preferably includes a pour spout 160 at an upper open end 112a or rim thereof. To properly mate with or secure to the upper open end 112a, an outer one of the concentric, spaced-apart walls 156a includes an arcuate-shaped protrusion 162 that is sized and shaped to conform to the pour spout 160 of the jar 112. As a result of the arcuate shape of the protrusion 162, the drip-catching channel 126 of the second preferred embodiment is also slightly modified in shape or configuration from the channel 26 of the first preferred embodiment. Specifically, the drip-catching channel 126 is sized and shaped to conform to the generally arcuate-shaped protrusion 162. In addition, the outer wall 156a includes a plurality of spaced-apart cutouts 174 at a free end or bottom thereof, which allows the outer wall 156a to conform to jars having rims of various sizes and shapes.

Figure 9:
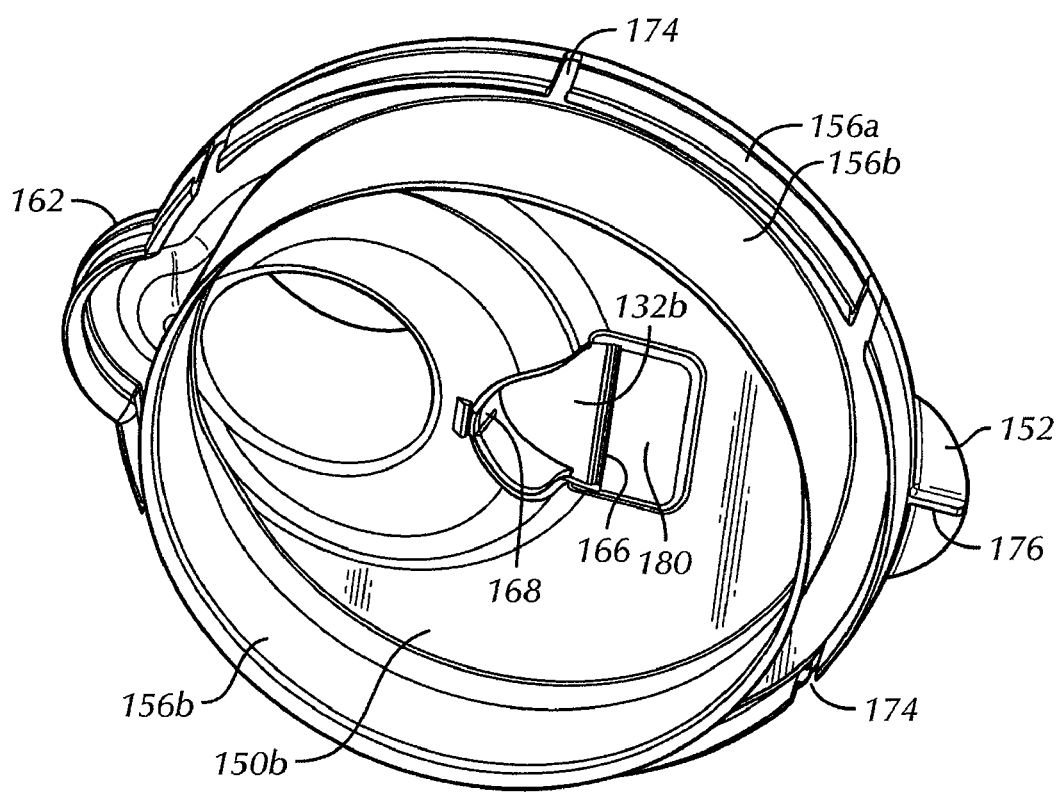
FIG. 9 is a bottom left perspective view of the lid shown in FIG. 7, with the closure shown in a first or closed position and the cap removed for clarity.

As seen in FIG. 9, the inner wall 156b preferably does not include a protrusion similar in shape to the protrusion 162 of the outer wall 156a. Thus, when viewed from below, the generally shape of the inner wall 156 includes a portion that is not substantially identical to the shape of the outer wall 156a. However, as is understood by those skilled in the art, the shape of the inner wall 156b may be modified to conform to the shape of the outer wall 156a and, thus, the pour spout 160 of the jar 112. Furthermore, unlike the first preferred embodiment, the height or length of the inner wall 156b, measured from the bottom surface 150b of the base 150 to a free end of the inner wall 156b, is preferably greater than the height or length of the outer wall 156a. Therefore, the free end or bottom surface of the inner wall 156b is noticeably lower than the free end or bottom surface of the outer wall 156a when the lid 122 is mounted to the jar 112.

Figure 8:
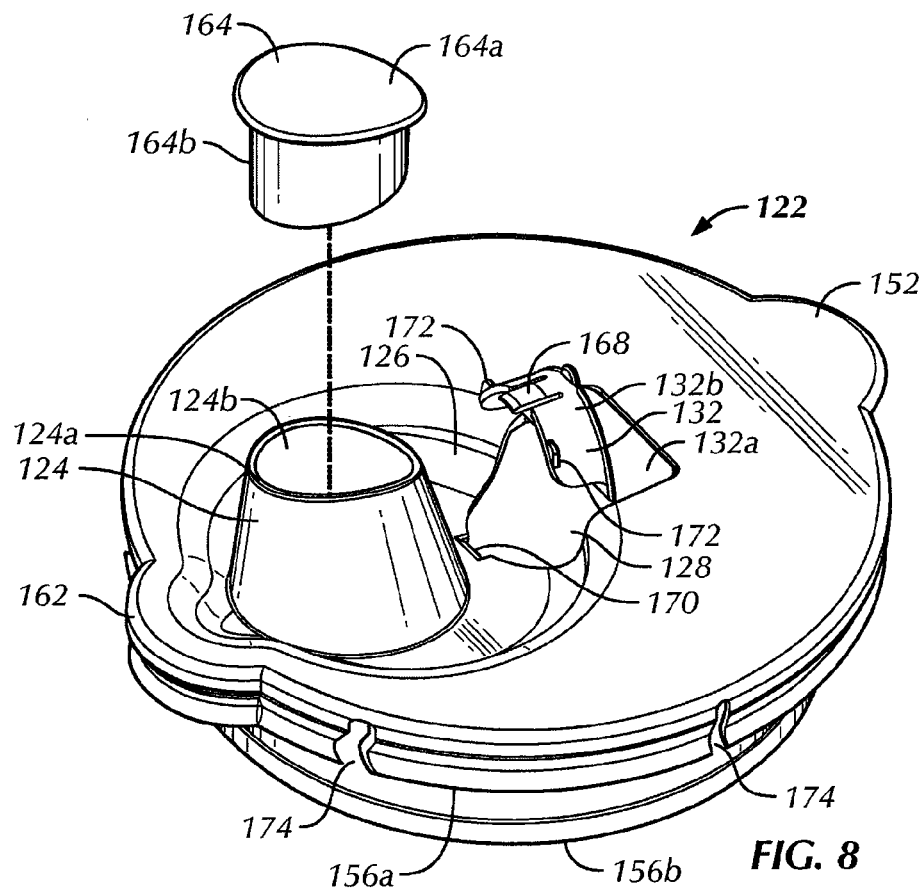
FIG. 8 is a top left perspective view of the lid shown in FIG. 7, with a closure shown in a second or open position and a cap spaced-apart from a pour spout of the lid.
Figure 10:
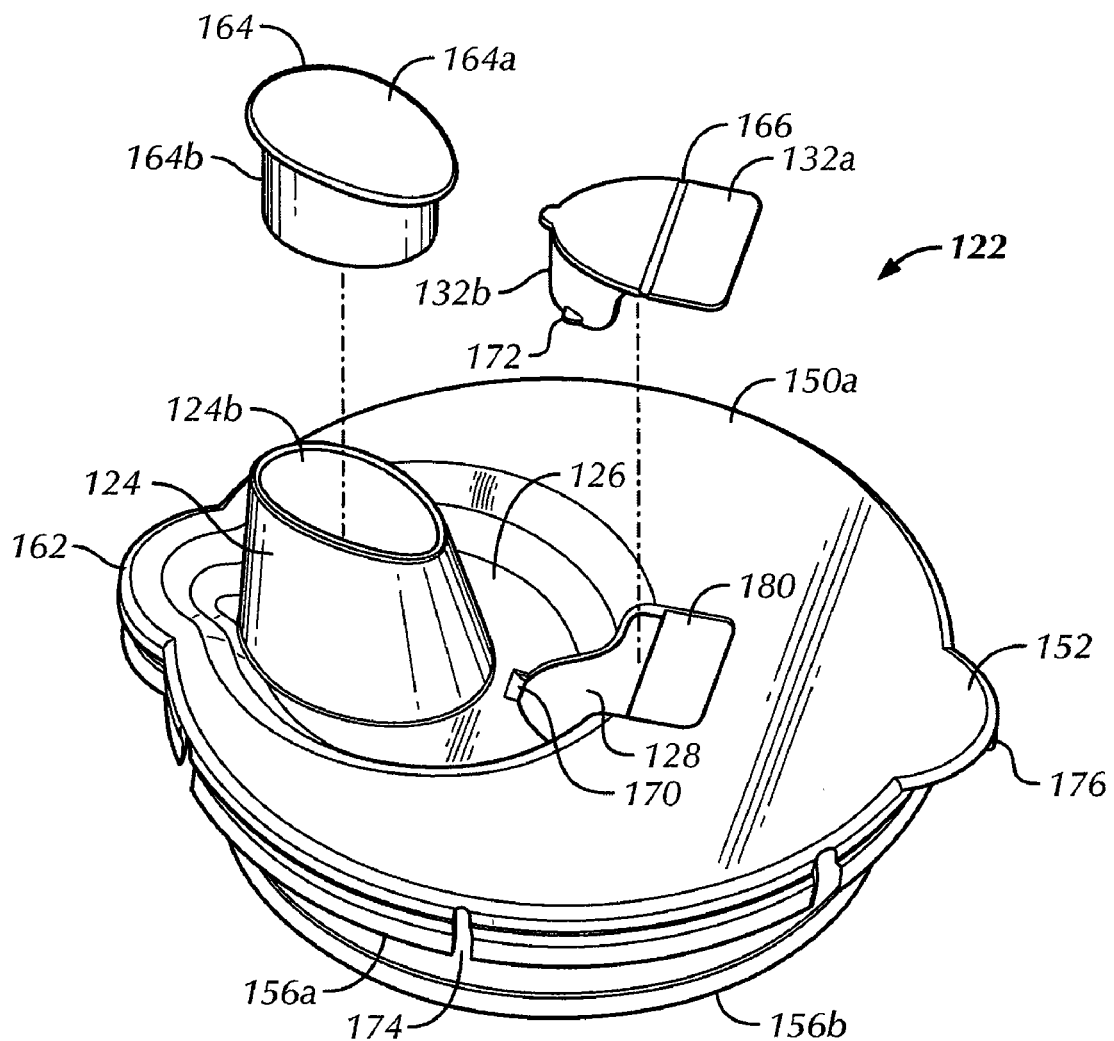
FIG. 10 is a top left perspective view of the lid shown in FIG. 7, with the closure shown in a spaced-apart relationship from the lid and the cap spaced apart from the pour spout of the lid.

As seen in FIGS. 7, 8 and 10, the second preferred embodiment of the lid 122 includes a cap 164 removably mountable within a passageway 124b of the pour spout 124. Preferably, the cap 164 is sized and shaped to completely enclose the passageway 124b of the pour spout 124 such that foodstuff, air and/or steam is at least substantially prevented from traveling through the passageway 124b. The cap 164 preferably includes a generally planer top wall 164a and a generally cylindrical skirt or side wall 164b that preferably extends generally orthogonally from a bottom surface of the top wall 164a. Furthermore, the side wall 164b is spaced a predetermined distance within the outer circumference of the top wall 164a such that substantially the entire side wall 164b may be inserted into the passageway 124b of the pour spout 124. Further, it is preferred that the circumference of the top wall 164a is at least slightly larger than the circumference of the crisp edge 124a of the pour spout 124 such that the cap 164 rests within the pour spout 124 as the top wall 164a of the cap 164 sits directly on the crisp edge 124a.

Referring again to FIGS. 7-10, the second preferred embodiment of the lid 122 includes a closure 132 pivotally attached to a portion of the base 150 of the lid 122. Preferably, the closure 132 is located proximate a geometric center or central area of the lid 122 such that the closure 132 corresponds to the opening 128, which is generally enlarged as compared to the first preferred embodiment. At least a portion of the closure 132 is movable and/or pivotable between a first or closed position (FIGS. 7 and 9) in which the opening 128 is at least partially blocked, such that foodstuff is prevented from being inserted into or removed through the opening 128 and/or air or steam is substantially prevented from escaping from the jar 122 through the opening 128 and a second or open position (FIG. 8) in which the opening 128 is at least partially exposed such that foodstuff may be inserted into or steam may escape from the opening 128.

Preferably, the closure 132 includes a first stationery portion 132a that is preferably ultrasonically welded to the base 150 and a second movable portion 132b that is pivotally attached to the first stationery portion 132a. It is preferred that a living hinge 166 pivotally attaches the first stationery portion 132a to the second movable portion 132b. However, it is understood by those skilled in the art that virtually any connection device, such as a standard hinge, may connect the first and second portions 132a, 132b of the closure 132. Preferably, the first stationery portion 132a is permanently attached, such as by ultrasonic welding, to a depression or indentation 180 formed in a top surface 150a the base 150. Thus, the first stationary portion 132a is preferably sized and shaped to fit within the depression 180 such that a top surface of the first stationary portion 132a is preferably flush with the top surface 150a of the base 150. However, it is understood by those skilled in the art that the closure 132 may be removably attached to the base 150 or the closure may be formed of a single piece or portion.

As seen in FIGS. 7 and 9, the second movable portion 132b of the closure 132 may be sized and shaped to create a generally air tight closure with the drip catching channel 126 by substantially blocking the opening 128. However, in the preferred embodiment, some air/steam may escape through the opening 128 even when the second movable portion 132 is in the first, closed position (FIGS. 7 and 9). The second movable portion 132b is generally arcuate in shape to conform to the shape of the opening 128. Preferably, the closure 132 includes a locking tab 168 that is sized and shaped to engage a notch 170 in a portion of the outer circumference of the opening 128 such that the closure 132 may not be inadvertently opened. Further, it is preferred that the closure 132 includes at least one, but preferably two spaced-apart tabs 172 that extend generally perpendicular from a surface of the second movable portion 132b to prevent the closure 132 from inadvertently being pushed beneath the base 150 and/or drip-catching channel 126 of the lid 122.

As seen in FIG. 8, the opening 128 of the second preferred embodiment is modified in size and shape as compared to the opening 28 of the first preferred embodiment. Preferably, the total cross-sectional area of the opening 128 is greater that 0.785 in$^2$ and the opening 128 is located in the geometric center of the lid 122. As one of ordinary skill in the art understands, an opening 128 of this size and location is excluded from being subjected to or passing an Underwriters Laboratory, Inc. (U.L.) splash test. The opening 128 may be generally circular and/or oblong in shape and sized to allow foodstuff to be passed therethrough. Thus, when the cap 164 is removed from the passageway 124b of the pour spout 124 of the lid 122 and the second movable portion 132b is in the second or open position (FIG. 8), relatively large pieces or chunks of foodstuff may be inserted into the interior of the jar 112 through either or both of the passageway 124b and the opening 128 even when the lid 122 is mounted to the rim 112a of the jar 112.

As seen in FIGS. 7-8, the gripping mechanism or handle 152 of the second preferred embodiment is generally arcuate in shape and extends outwardly from a top surface 150a of the base 150. Although the handle 152 in FIGS. 7, 8 and 10 is not shown to include arcuate and raised protuberances as in the first preferred embodiment, it is understood that protuberances may be included on the top or bottom surfaces of the handle 152. Further, as seen in FIGS. 9 and 10, a supporting rib 176 is preferably located on a bottom surface of the handle 152 to provide increased rigidity to the handle 152. Specifically, the supporting rib 176 extends generally perpendicularly from the bottom surface of the handle 152.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as described by the appended claims.

I claim:

1. A mixing device configured to blend foodstuff, said device comprising:
    a housing that encloses at least one motor;
    a jar removably mountable to said housing in an operating configuration for containing foodstuff, said jar having an upper open end and a lower closed end; and
    a lid removably mountable to said upper open end of said jar to enclose foodstuff therein, said lid including a pour spout extending generally vertically upwardly from said lid, said pour spout defining a passageway, and a channel generally surrounding said pour spout;
    an opening extending completely through the lid, said opening being spaced apart from said passage; and
    said channel angled downwardly from a first portion of said lid to a second portion of said lid, said opening positioned proximate the lowest portion of said downwardly angled channel wherein said channel collects errant drips of the foodstuff when said lid is mounted to said jar and the foodstuff is poured out of the jar through said pour spout, said errant drips of foodstuff returned to said jar via said opening.

2. A device in accordance with claim 1, wherein said said opening is proximate a central area of said lid.

3. A device in accordance with claim 1, wherein said pour spout is in the shape of an inverted funnel when said lid is mounted to said jar.

4. A device in accordance with claim 2, wherein said lid includes a base that generally surrounds said channel and said pour spout, said base having a top surface and an opposing bottom surface.

5. A device in accordance with claim 4, wherein a pair of walls extend from said bottom surface of said lid to removably engage said upper open end of said jar.

6. A device in accordance with claim 4, further comprising:
    a handle extending outwardly from said base, said handle including at least one rib to assist in grasping the lid.

7. A device in accordance with claim 4, wherein a lowest portion of said channel extends below said base and into said jar when said lid is mounted to said jar.

8. A device in accordance with claim 2, further comprising:
    wherein said lid includes a base that generally surrounds said channel and said pour spout, said base having a top surface and an opposing bottom surface;
    a closure pivotally attached to said base proximate said opening, at least a portion of said closure being movable between a first position in which said opening is at least partially blocked and a second position in which said opening is at least partially exposed.

9. A device in accordance with claim 8, wherein said closure includes a living hinge pivotally attaching a first stationary portion of said closure to a second movable portion of said closure.

10. A device in accordance with claim 1, further comprising:
    a cap removably mountable within the passageway of said pour spout.

11. A device in accordance with claim 1, wherein said jar is made of glass.

* * * * *